US010395305B2

(12) United States Patent
Graham et al.

(10) Patent No.: US 10,395,305 B2
(45) Date of Patent: *Aug. 27, 2019

(54) DISTRIBUTION CHANNEL USING AUDIO/VISUAL RECOGNITION

(71) Applicant: Disney Enterprises, Inc., Burbank, CA (US)

(72) Inventors: Jessica Graham, Burbank, CA (US); Tuomo Korpinen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,936

(22) Filed: Dec. 6, 2017

(65) Prior Publication Data

US 2018/0101896 A1  Apr. 12, 2018

Related U.S. Application Data

(63) Continuation of application No. 13/844,414, filed on Mar. 15, 2013.

(60) Provisional application No. 61/739,664, filed on Dec. 19, 2012.

(51) Int. Cl.
*G06Q 30/06* (2012.01)

(52) U.S. Cl.
CPC .............. *G06Q 30/0641* (2013.01)

(58) Field of Classification Search
CPC .................................. G06Q 30/0641
USPC .............................. 705/26.1–27.2
See application file for complete search history.

(56) References Cited

U.S. PATENT DOCUMENTS

| 8,126,858 | B1* | 2/2012 | Ruzon | G06F 17/30247 707/694 |
| 8,606,645 | B1* | 12/2013 | Applefeld | G06T 19/006 705/14.25 |
| 8,620,772 | B2* | 12/2013 | Owen | H04N 5/235 705/26.9 |
| 8,806,659 | B1 | 8/2014 | Miazzo et al. | |
| 9,171,298 | B2 | 10/2015 | Atkinson et al. | |

(Continued)

OTHER PUBLICATIONS

"Tesco partners with Blippar for augmented reality print campaign," Sep. 28, 2011. The Drum. http://www.thedrum.com/news/2011/09/28/tesco-partners-blippar-augmented-reality-print-campaign. Including: "Tesco joins forces with Blippar for the Big Price Drop campaign," Sep. 26, 2011. YouTube: https://www.youtube.com/watch?v=iXNp7ZHX7pI.*

(Continued)

*Primary Examiner* — Jason B Dunham
*Assistant Examiner* — Anand R Loharikar
(74) *Attorney, Agent, or Firm* — Sheppard Mullin Richter & Hampton LLP (57) ABSTRACT

Systems and methods are provided for providing a platform to provide virtual storefronts to consumers. Environmental elements are associated with specific consumer services on computer server. A user in the environment takes audio or visual recordings of an environmental element and uploads the recordings to the server. The server determines the appropriate consumer service associated with the recorded environmental element and provides the user with a reference to the service. Accordingly, any space, such as a bus stop, subway or train terminal, movie theater, or airport, may be turned into a virtual store.

5 Claims, 7 Drawing Sheets

(56) References Cited

U.S. PATENT DOCUMENTS

| | | | |
|---|---|---|---|
| 2002/0080969 A1 | 6/2002 | Giobbi | |
| 2003/0223736 A1 | 12/2003 | Muzaffer et al. | |
| 2010/0122283 A1* | 5/2010 | Button | G06Q 30/02 |
| | | | 725/32 |
| 2011/0270697 A1* | 11/2011 | Sunkada | G06F 17/30247 |
| | | | 705/26.1 |
| 2011/0320944 A1* | 12/2011 | Nikara | G06F 9/451 |
| | | | 715/716 |
| 2012/0259744 A1* | 10/2012 | Ganesh | G06Q 30/00 |
| | | | 705/27.2 |
| 2014/0074664 A1* | 3/2014 | Amsalem | G06Q 30/0601 |
| | | | 705/27.1 |

OTHER PUBLICATIONS

"Tesco launches nationwide Augmented Reality campaign with Blippar," Oct. 12, 2011. YouTube: https://www.youtube.com/watch?v=2VQ9Nte2AJo.*

AACS, Advanced Access Content System: Pre-recorded Video Book, Revision 0.953, Final, Oct. 26, 2012.

* cited by examiner

DISTRIBUTION CHANNEL USING AUDIO/VISUAL RECOGNITION

CROSS-REFERENCE TO RELATED APPLICATIONS

This application is a continuation of U.S. patent application Ser. No. 13/844,414, filed on Mar. 15, 2013, which claims the benefit of U.S. Provisional Application No. 61/739,664, filed Dec. 19, 2012.

TECHNICAL FIELD

The present disclosure relates generally to marketing systems, and more particularly, some embodiments related to systems and methods for providing product distribution channels.

DESCRIPTION OF RELATED ART

Millions of dollars are spent on marketing every year. Ever greater efficiency to deliver immediate commercial opportunity for consumers is desired. Additionally, analytics/data of interaction and usage is an important tool for marketing, and methods for gathering such data are desired.

Two dimensional barcodes such as QR codes are used in consumer advertising. QR codes can encode information such as uniform resource locators (URLs) leading to marketing-related websites or internet provided services. Users can install an app on their phones or other mobile devices allowing the QR codes to be read by the mobile device. The users may then be directed to the marketing-related websites or internet provided services at the URLs encoded by the QR codes.

BRIEF SUMMARY

A platform to provide virtual storefronts to consumers is disclosed. Environmental elements are associated with specific consumer services on a computer server. A user in the environment takes audio or visual recordings of an environmental element and uploads the recordings to the server. The server determines the appropriate consumer service associated with the recorded environmental element and provides the user with a reference to the service. Accordingly, any space, such as a bus stop, subway or train terminal, movie theater, or airport, may become a virtual storefront.

Other features and aspects of the disclosure will become apparent from the following detailed description, taken in conjunction with the accompanying drawings, which illustrate, by way of example, the features in accordance with various implementations.

BRIEF DESCRIPTION OF THE FIGURES

The figures are provided for purposes of illustration only and merely depict typical or example embodiments. They do not limit the breadth, scope, or applicability of the invention.

DETAILED DESCRIPTION OF THE EMBODIMENTS OF THE DISCLOSURE

The disclosure provides a new platform by which to engage consumers, thereby extending the consumer experience and offering differentiation using existing marketing elements and physical product. In some implementations, image recognition technology is used to enhance the viewer's experience with a product offering. For example, adding image recognition technology to marketing elements (bus shelters, billboards, standees and ads (print and TV)) and physical product adds a level of interactivity, education, and commercialization, which would not be possible otherwise.

Using visual/image recognition technology combined with elements of augmented reality technology, a new distribution channel can be created by taking advantage of existing marketing materials (e.g. bus shelters, standees, billboards) and physical product (BDs and DVDs) in the marketplace. A new platform for consumers and movie-goers is created to engage with is thereby created. This yields a new commercial path and revenue generation, for example but not limited to, purchasing movie tickets from a bus shelter or digital products from a DVD, BD or VHS.

This platform may allow creation of marketing elements such as a "virtual wall" selling merchandize via image recognition technology in areas of tight real estate or places product wouldn't normally be sold.

Utilizing bus shelters, movie posters, and other marketing elements can help put more people in theater seats. The Virtual Wall can help entice movie-goers once in the theater and introduce digital commercialization to theaters in a very cost effective manner. Examples include movie theaters (TDS product and/or DVDs & BDs) and stores (DVDs and BDs).

In one implementation, the consumer downloads a visual recognition app to their device (e.g., a smartphone or tablet) and interacts with products using image recognition technology. For example, the product may comprise a movie poster, product advertisement, bus shelter, product label, product packaging, or any other element in the environment. In some implementations, products that are compatible with the application have a logo or other information element on the product. However, the logo or other information element does not have to be present. Rather, the logo simply signals that interactivity is possible. Once the trigger image is recognized an interface appears on the device with the various purchase options. The interface can be scaled and modified based on creative or strategy. All platforms available such as, but not limited to iOS® or Android®. For example, the interface can be provided through a web browser on the device.

Examples of interactivity with a virtual wall or marketing element include: ordering movie tickets from a movie poster, bus shelter or TV ad; disc to digital up-grades from movie posters or physical product; registering or claiming rewards on reward programs such as a movie rewards program; pre-ordering or purchasing a Blu-Ray/DVD from movie posters or existing physical product; finding out more about a movie or service, such as watching trailers (informational data that may be either programmed or sourced from existing web-based services). Any functionality described herein may also be available through visual recognition of audio visual content on tv/video (utilizing audio recognition and or visual recognition footprints). Additional services include augmented reality. For example, a user may take a picture with a virtual movie character using Facebook®, Email or Twitter® to share and potentially entice others to engage and consume Examples of marketing materials used (full marketing mix) include: movie posters or bus shelters; physical product—DVD, BD and VHS; audio via TV spot/Trailer; standees; and billboards.

Augmented reality and image recognition technology has primarily been used in marketing and brand awareness driven initiatives. However, these technologies have been unable to leverage existing marketing elements for such initiatives. For example, QR codes are obtrusive and must be developed specifically for a given initiative. Additionally, these technologies have not been utilized for distribution.

Figure 1:
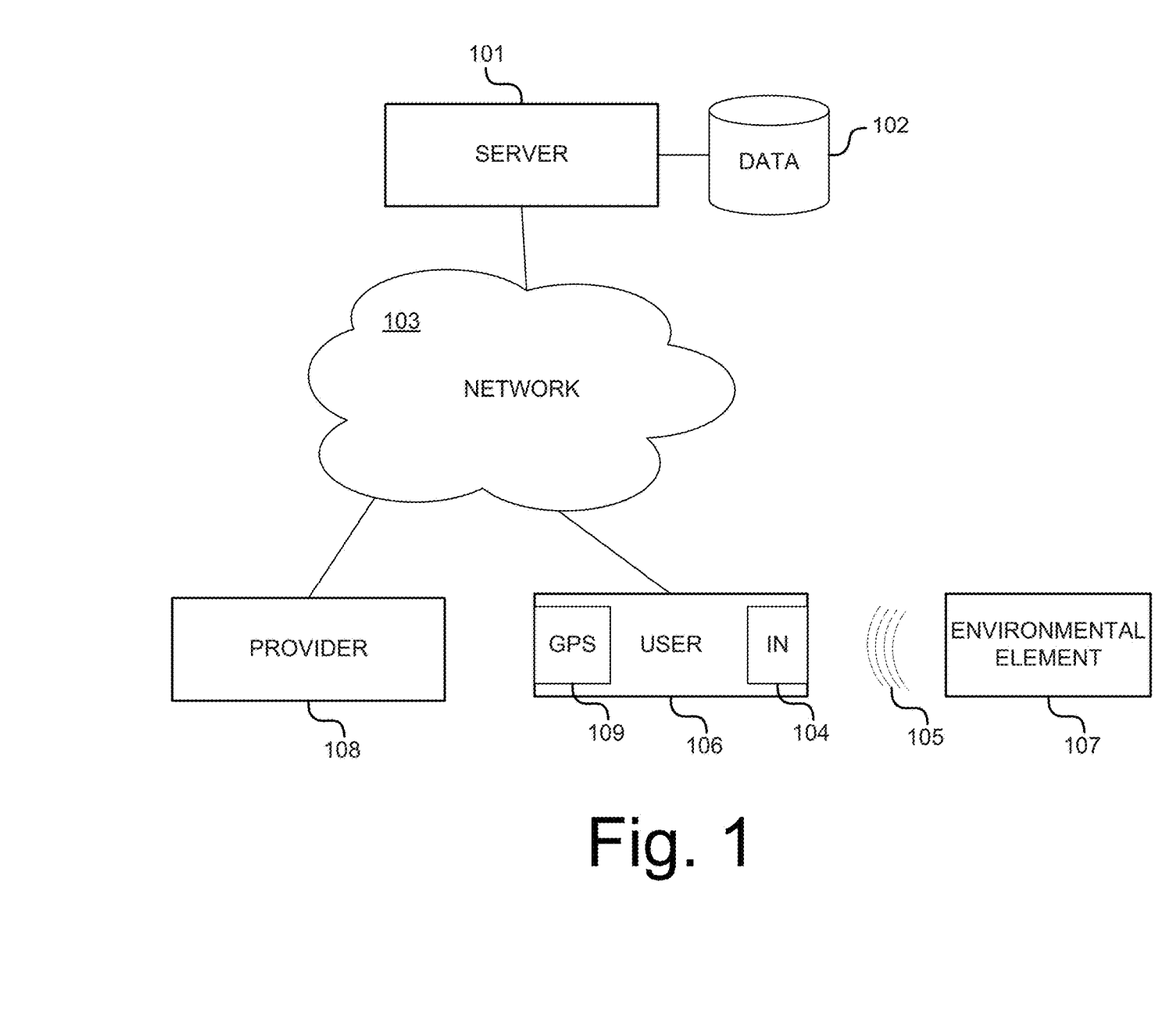
FIG. 1 illustrates an example system for providing a distribution channel.

FIG. 1 illustrates a system for providing a consumer engagement platform. The system comprises a server 101 having a data storage 102. The server 101 may comprise any product providing resources to client machines. For example, the server 101 may comprise dedicated computers, workstations, cloud servers, server clusters, or other server implementations. The data storage 102 may comprise local or network storage. The server 101 stores data associated with one or more environmental elements 107 in data storage 102. Additionally, the server 101 stores associations between the environmental elements 107 and specific services provided by provider 108. In some embodiments, the server 101 also associates location data with environmental elements 107 and the services provided by provider 108.

The server 101 is connected via a network 103, such as the internet, to a user device 106. The user device 106 may comprise various computing devices, such as desktop or laptop computers, tablets, mobile phones, media players, or other network connected devices. The user device 106 comprises an input 104 that is capable of recording 105 environmental elements 107. For example, the input 104 may comprise a microphone or digital camera. The input 104 may be configured to record an environmental element 107 upon manual command from the user of device 106 (for example, taking a picture) or may be configured to passively record the environmental element 107 (for example, always-on microphone functionality). In some implementations, the user device 106 may comprise a GPS 109 or other module capable of providing location information.

A service provider 108 is also connected to network 103. The service provider 108 may comprise a server, host, merchant, or other network-connected service provider. For example, the service provider 108 may provide a digital storefront for users of user device 106 to purchase products such as merchandise (such as clothing, or toys) physical copies of media (such as films, books, or songs), digital copies of media, digital streams of media, tickets for events or entertainment venues, preorders of upcoming releases. Such products may be purchased for the user of device 108 or may be gifted to others. The service provider 108 may be equipped to allow the purchase of products using a variety of currencies, such as credit cards, virtual currencies, social networking points, simple message service (SMS) text payment methods, PayPal®, or carrier bills. As further examples, the service provider 108 may provide other services such as club membership, social networking services, movie times, streaming audiovisual content, information retrieved from other existing web-based services, augmented reality services, or other services to engage users. In some implementations, the server 101 and the service provider 108 may be the same entity or may be under common control. In further implementations, the service provider 108 may provide a service to the user device 106 based on location data received from the user device 106. For example, the service provider 108 might provide an option to purchase a movie ticket if location data indicates the user device 106 is in the vicinity of a movie theater.

Environmental element 107 may comprise any audio or visual presentation that may be encountered by the user of device 106. For example, the environmental element 107 may comprise a non-encoded design element, such as a graphic, a marketing element, a bus shelter, a standee, an advertisement, a physical product, a movie poster, a toy, an audio or visual clip from a movie or television show, a commercial, or a package such as a DVD/Blu-Ray or VHS case. In some implementations, the environmental element 107 further comprises an icon, graphic, or other indication that there are services associated with the environmental element 107. The environmental element 107 may comprise pre-existing materials or may comprise materials developed to be associated with the services provided by service provider 108.

Figure 2:
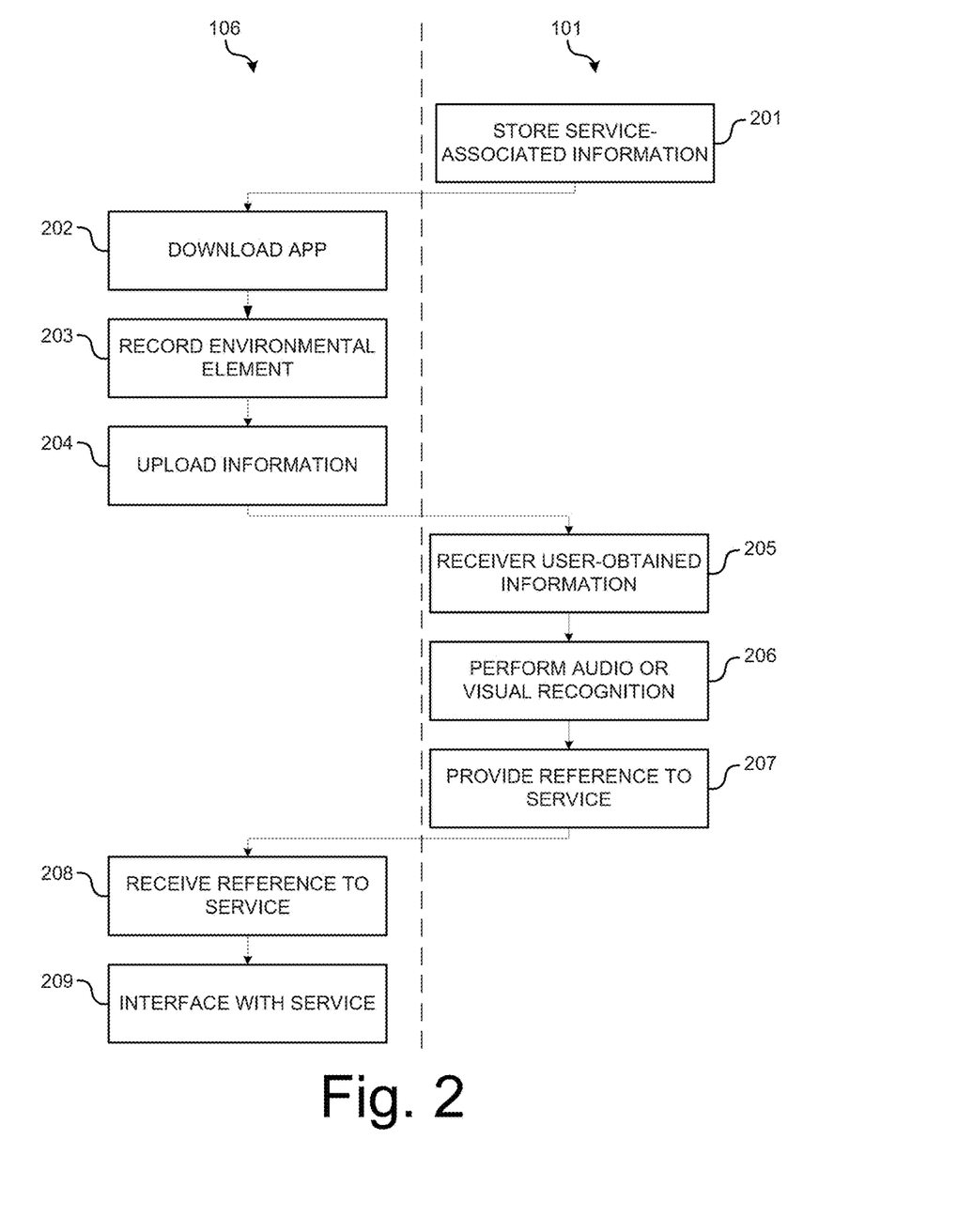
FIG. 2 illustrates an example method of providing a distribution channel using the system of FIG. 1.

FIG. 2 illustrates a method of operation of a user device 106 and a server 101. In step 201, the server 101 stores service-associated information in data storage 102. The service-associated information is information sufficient to allow the server 101 to perform recognition processes on information provided by user devices. For example, the service-associated information may comprise copies of the environmental elements 107, images of the environmental elements 107, recordings of environmental elements 107, or recognition usable primitives derived from the environmental elements 107. The services associated with the service-associated information can be any services provided by provider 108.

In step 202, the user device 106 downloads a mobile application (app) to allow the user device 106 to interface with the server 101. In various embodiments, the app can be downloaded from server 101, service provider 108, or a third party hosted app store. In other embodiments, step 202 can be omitted and the user device 106 can interact with the server 101 using other methods, such as through a web browser.

In step 203, the user device 106 records an environmental element in the vicinity of the user device 106. For example, the user device 106 may take a picture of a graphic, such as a movie poster, bus shelter, or kiosk. As another example, the user device 106 may take an audio recording of a song or commercial. As another example, the user device 106 may take a video recording of a portion of a movie, commercial, or television show. In some implementations, the user device 106 performs step 203 in response to a command from the user of device 106. In other implementations, the user device 106 performs step 203 automatically.

In step 204, the user device 106 uploads information obtained from the step 203 of recording the environmental element. For example, the user device 106 may upload the data obtained by the step 203 of recording. As another example, the user device 106 may perform some preprocessing as part of step 203. The preprocessing may reduce the amount of data sent to server 101 or may assist the server 101 in performing the audio or visual recognition.

In step 205, the server 101 receives the user-obtained information uploaded in step 204. In step 206, the server 101 performs an audio or visual recognition process on the information obtained in step 205. The audio or visual recognition process identifies the environmental element recorded in step 203. Additionally, during step 205, the server 101 identifies the service or services associated with the identified environmental element.

In step 207, the server 101 provides a reference to the identified service to the user device 106. For example, the reference may be a URL to the service. In step 208, the user device 106 receives the reference. In step 209, the user device interfaces with the service provided by service provider 108. In other implementations, steps 207 and 208 may be omitted, and the server 101 may provide the identified service directly to the user device 106.

Figure 3:
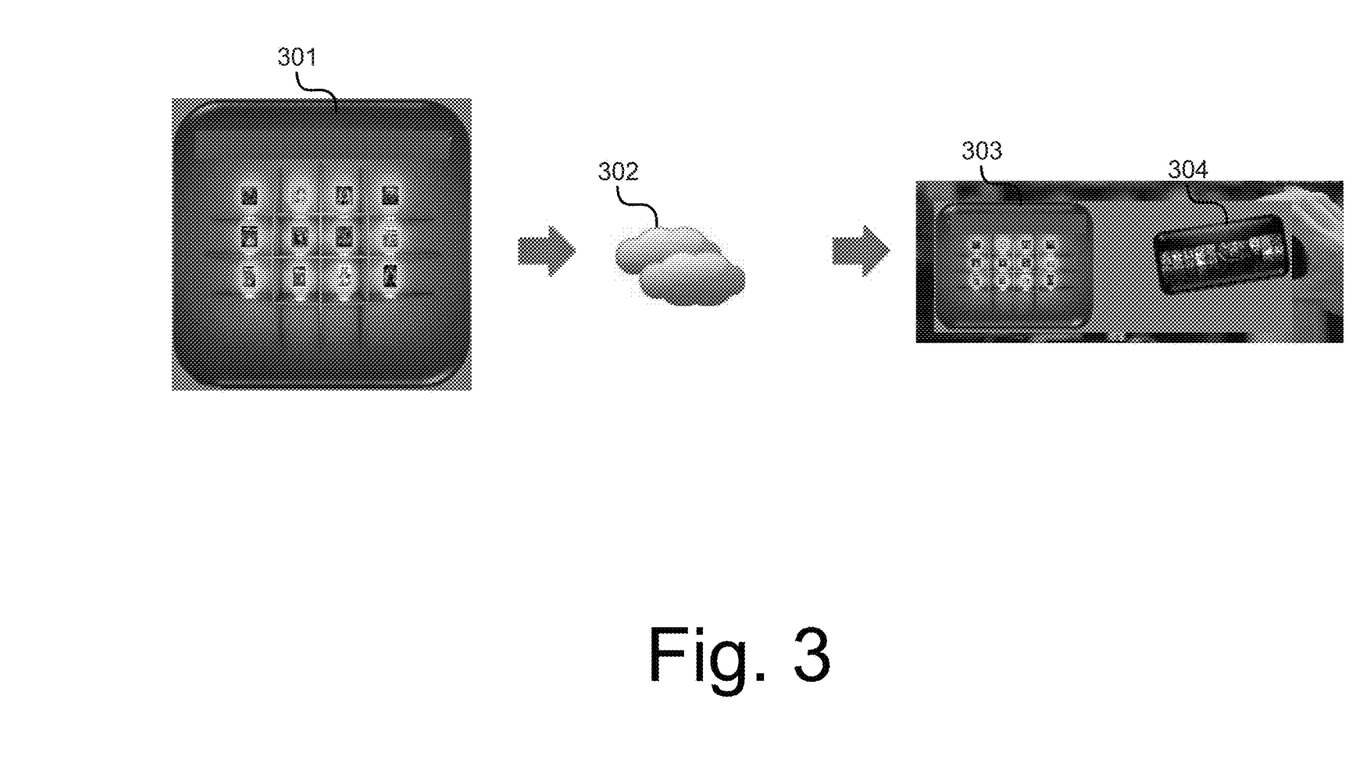
FIG. 3 illustrates an example implementation of the system of FIG. 1.

FIG. 3 illustrates a system and method for providing a distribution channel using image recognition and augmented reality technology. Here, image recognition is added to existing marketing elements (bus shelters, billboards, standees and ads (print and TV)) and physical product adds a level interactivity, education, and commercialization, which would not be possible otherwise.

In this implementation, one or more images 301 are uploaded and stored in a cloud network 302 or other server. For example, with reference to FIG. 1, images 301 may be an implementation of information related to an environmental element 107 and cloud network 302 may be an implementation of server 101 and data storage 102. Services are associated with the images 301 and the associated services are stored in the server 302. For example, a separate service may be stored for each image. Alternatively, combinations of images 301 may have associated services. For example, a particular array of images 301 may be recognized by server 302 as corresponding to a particular digital storefront provided by particular provider 108.

During operation, a user uses a device 304 to take an image or recording of a product 303 displaying one or more of the images 301. For example, this step may be an implementation of a user device 106 recording 105 an environmental element 107. The device 304 transmits the recorded information to the server 302. The server 302 then recognizes the images 301 on product 303 and transmits a direction command to the device 304. For example, the direction command may be an implementation of a reference to a service provided by provider 108.

The device 304 Is then directed to the associated service, such as a mobile storefront. For example, the product 303 may comprise a display of a set of movie posters or other images 301. The device 304 takes a picture of the set of movie images 301, and the server 302 may provide a storefront allowing the user to preorder any one of the movies. Alternatively, the sever 302 may direct the device 304 to a website offering such services. The electronic stores provided by the server 302 or other website may use a variety of currencies, such as virtual currency, Facebook® points, SMS payment, PayPal®, carrier bills, or movie reward program points. As another example, the server 302 may send a list of recognized movies, including links to product purchase sites, movie trailers, or other services. For example, the set of images 301 may be virtual store.

Accordingly, the system creates a new platform by which to engage consumers thereby extending the consumer experience and offering differentiation using existing marketing elements and physical product.

Figure 4:
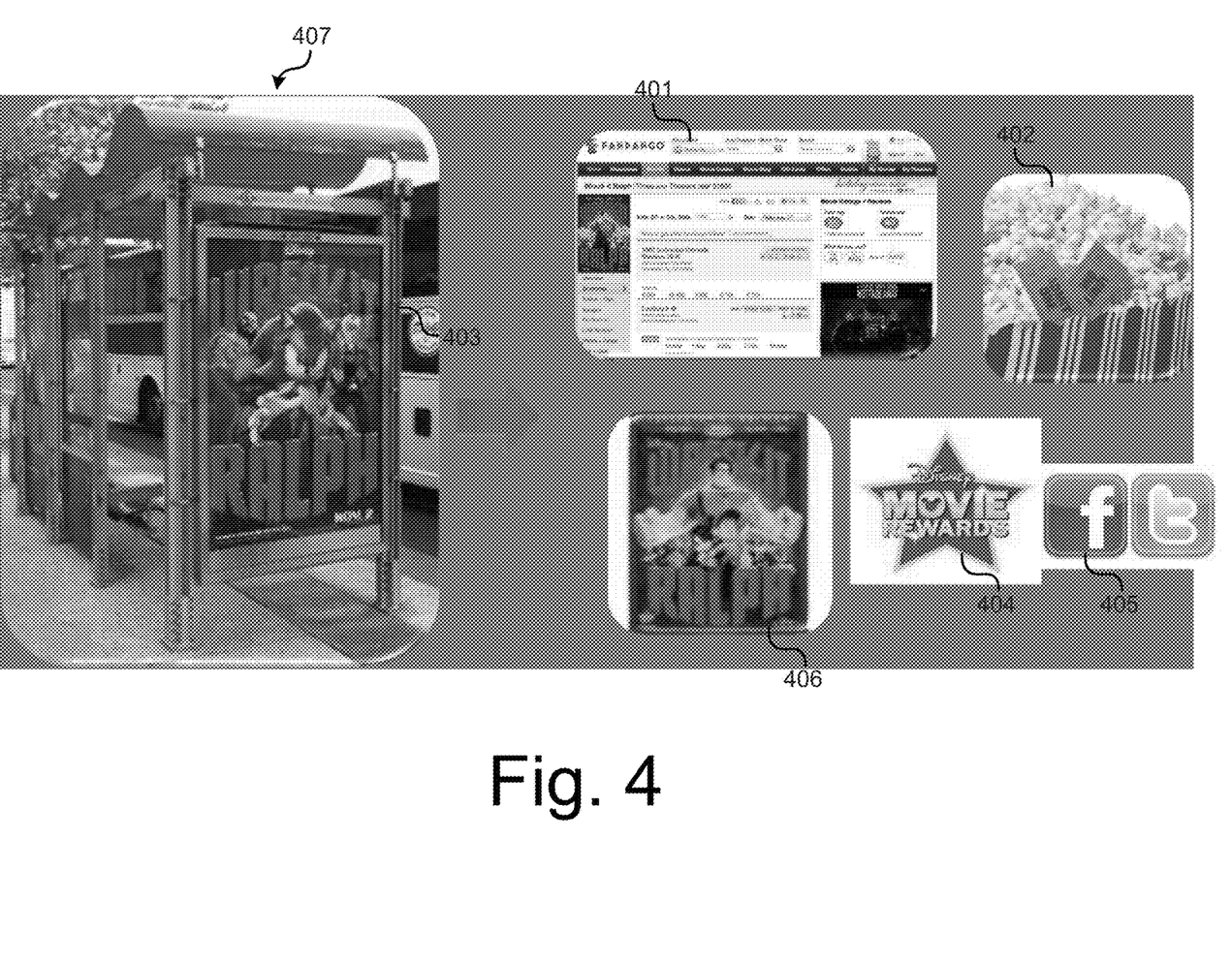
FIG. 4 illustrates an example deployment of a virtual storefront platform using the system of FIG. 1.

FIG. 2 illustrates an example deployment of a distribution channel using a movie poster 403 at a bus stop 407. This deployment may be implemented using the system of FIG. 1. The movie poster 403 may comprise an environmental element 107. An image used for a movie poster 403 is stored in the server 101 on data storage 102 and associated with various services 401, 402, 404, 405, 406 provided by one or more providers 108. For example, a movie ticket purchase service 402, a movie review website 401, a pre-order 406 of the movie, a service for claiming rewards points or purchasing merchandise (e.g., clothes or toys) 404, or social network features 405. Accordingly, when a user views the poster 403, the user may use a user device to take a picture of the poster 403 and upload the picture to the server 101. The server 101 then recognizes the poster 403 and directs the user to one of the services 401, 402, 404, 405, or 406.

Figure 5:
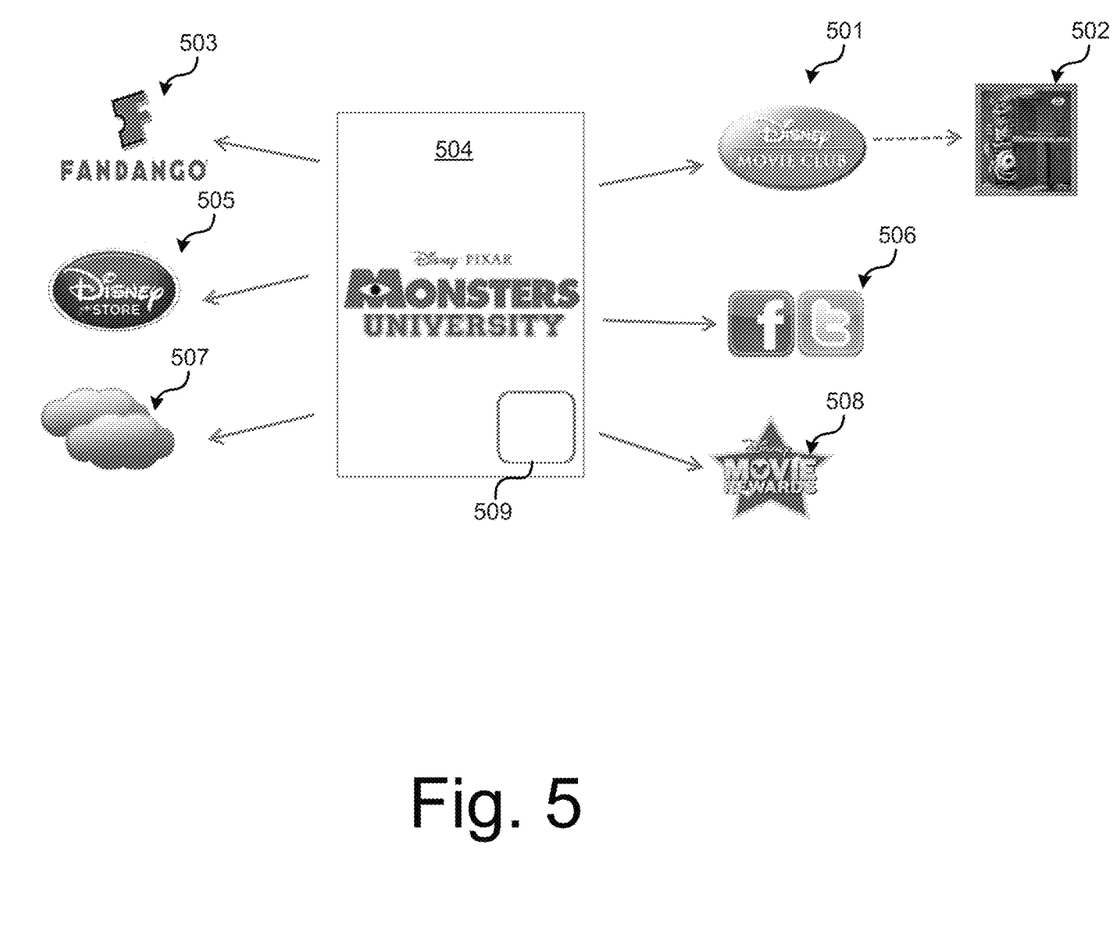
FIG. 5 illustrates a second example deployment of a virtual storefront platform using the system of FIG. 1.

FIG. 5 illustrates an example deployment in a theater. A poster, image, other marketing element, or standee 504 is provided in a theater. This deployment may also be implemented using the system of FIG. 1. The poster or standee 504 image is uploaded onto a cloud or other server 507 and associated with services 501, 502, 503, 505, 506, 508. The poster 504 may also be equipped with a logo or decal 509. The logo or decal 509 may indicate to users that the poster 504 is associated with services 501, 502, 503, 505, 506, 508, and can be used with their user devices 106 or applications stored on their user devices 106.

When the user takes a picture of the marketing element 504, the picture is uploaded to the server 507. At the server 507, the server 507 recognizes the image 504 and directs the device to one of the services 502, 503, 505, 506, 508. As examples, the services may include: movie ticket purchase services 503; movie or product pages 501, including trailers 502; social networking sites 506, for example, the service may be a link to share the product on Facebook® or Twitter®; movie rewards sites 508; or electronic stores 505.

Figure 6:
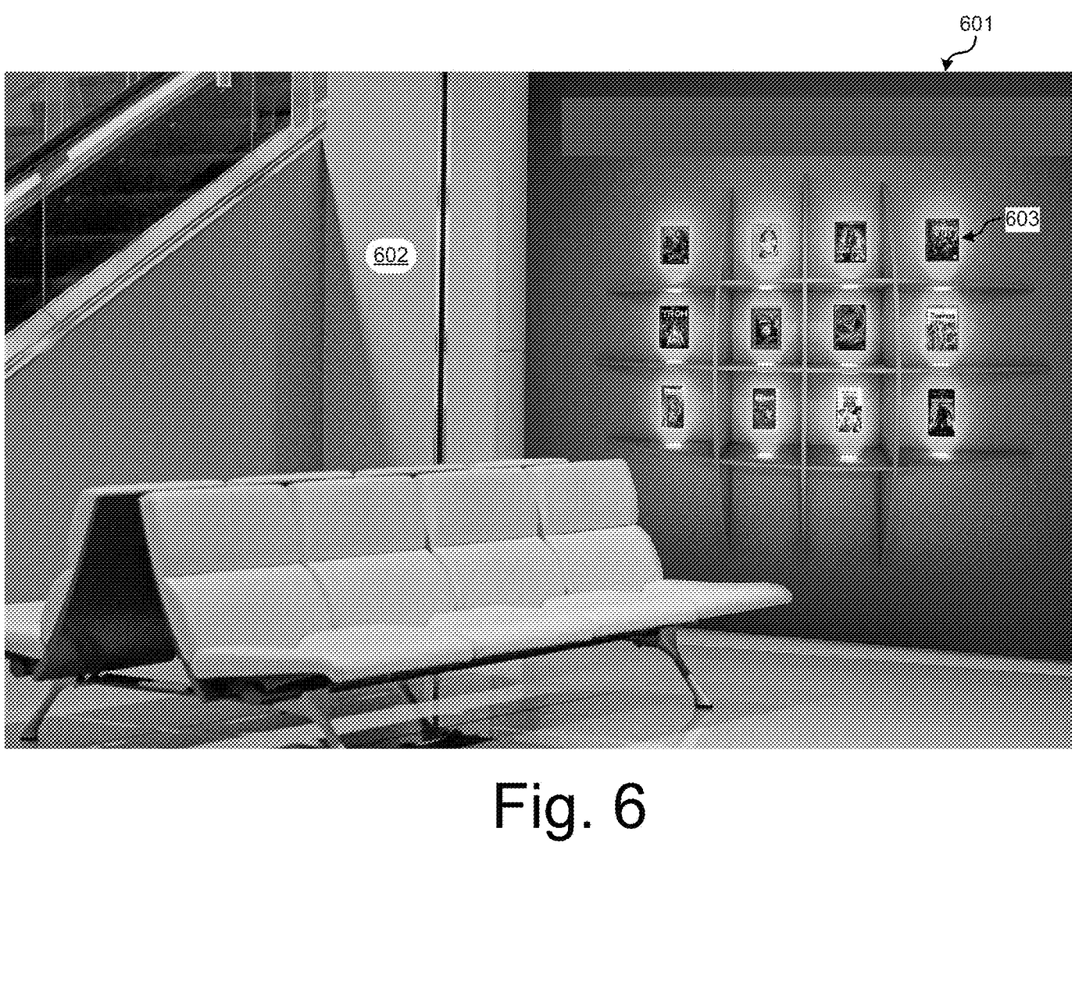
FIG. 6 illustrates a third example deployment of a virtual storefront platform using the system of FIG. 1.

FIG. 6 illustrates another example deployment that may be implemented using the system of FIG. 1. Here, a virtual wall 601 is deployed in an environment 602 such as a theater, airport, or hotel. The wall virtual 601 presents a variety of content related images 603, such as images of cover art. Each image 603 is associated with a corresponding service, for example, purchase of an electronic copy of the content corresponding to the image 603. A user may then use the virtual wall 601 to select which product the user wishes to purchase. The user may then take a picture of that product and be sent an electronic copy of the content. As another example, the user may take a picture of the entire virtual wall 601, or a portion thereof, and be presented with service options corresponding to all of the images 603 of the entire virtual wall 601 or portion thereof.

Figure 7:
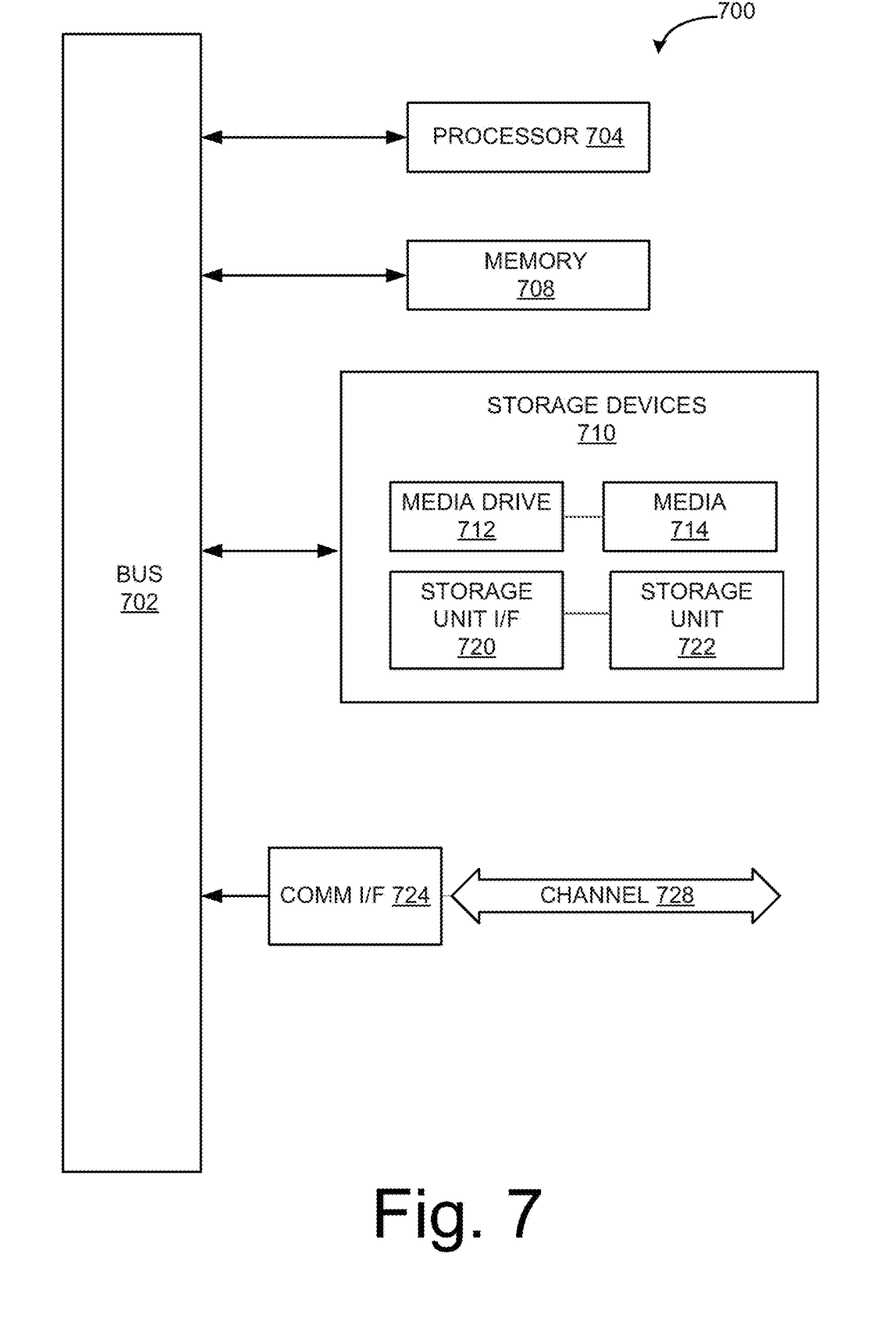
FIG. 7 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example—computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 720, storage media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. An interactive environmental element system comprising:
   an environmental element adapted to display a plurality of non-encoded design elements capturable by a user device, wherein the plurality of non-encoded design elements have been associated with service-associated visual information stored on a server, wherein the user device is adapted to send the plurality of non-encoded design elements to the server, and wherein the server is adapted to perform visual recognition for the plurality of non-encoded design elements and to provide the user device with a service based on two or more of the plurality of non-encoded design elements.

2. The interactive environmental element system of claim 1, wherein each of the plurality of non-encoded design elements is associated on the server with a different service.

3. The interactive environmental element system of claim 1, wherein the service comprises an electronic store, a social network, or a video streaming network.

4. The interactive environmental element system of claim 1, wherein the service is an augmented reality application.

5. The interactive environmental element system of claim 1, wherein the environmental element is a marketing element.

* * * * *